June 24, 1930.  L. C. GALLI  1,768,048
TIRE ALARM
Filed May 27, 1929
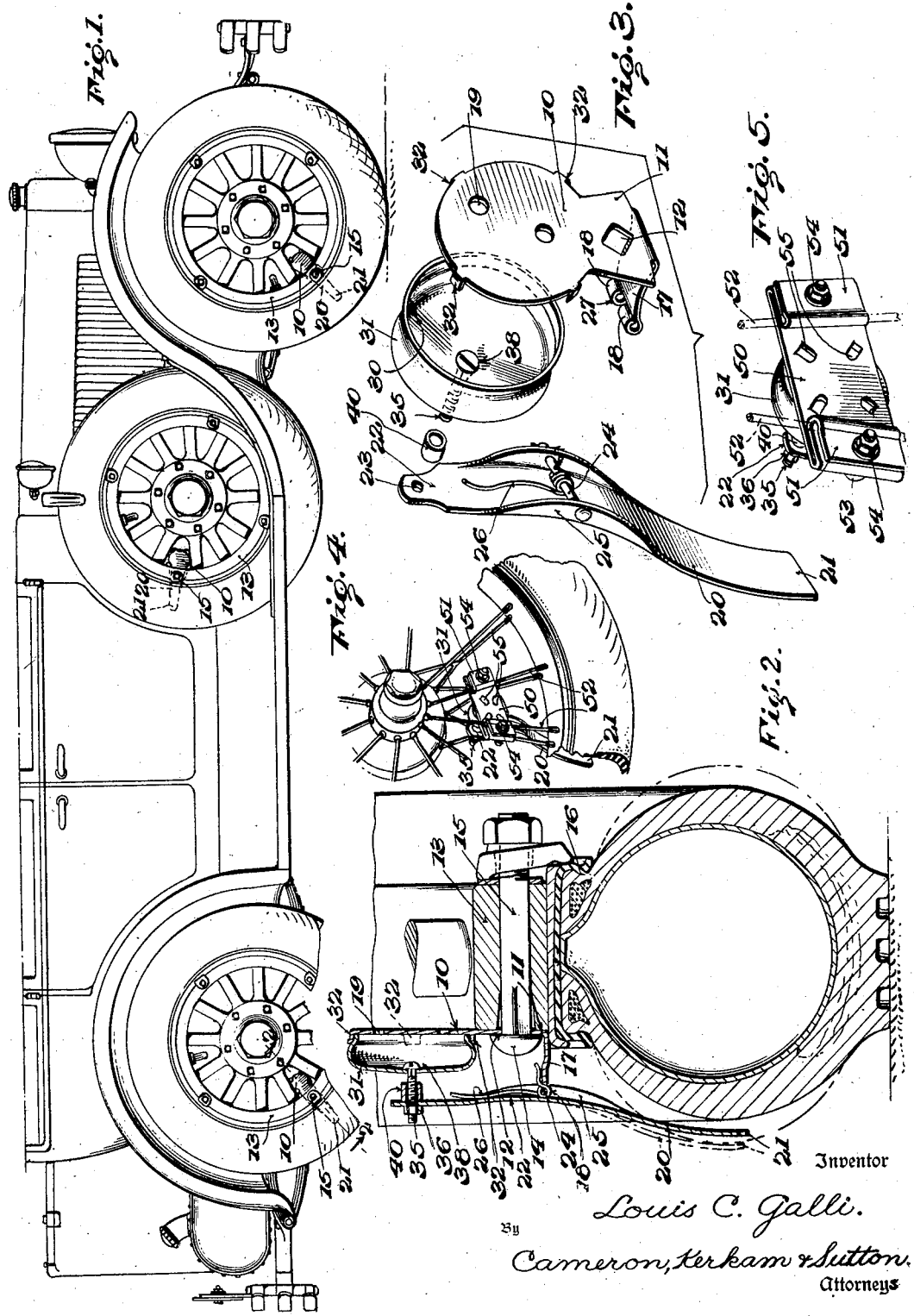
Inventor
Louis C. Galli.
By
Cameron, Kerkam & Sutton.
Attorneys Patented June 24, 1930

1,768,048

UNITED STATES PATENT OFFICE

LOUIS C. GALLI, OF FERNDALE, MARYLAND

TIRE ALARM

Application filed May 27, 1929. Serial No. 366,384.

This invention relates to alarms for advising the driver of a vehicle employing neumatic tires that a tire is not in a proper condition of inflation. While alarms of this character may be provided to denote overinflation or underinflation, their principal service is to warn the driver when his tire has become nearly or quite flat, as by reason of a puncture, leaky valve, or the like, and it is in connection with this service that the present invention will be described, although it is to be expressly understood that the invention may be embodied in devices for advising the driver of overinflation or underinflation within the purview of this invention.

It has heretofore been proposed to provide each tire with a device which is rendered operative when the tire is flat for the purpose of ringing a bell, operating a buzzer, or otherwise producing a signal that will be audible to the driver. Devices of this character heretofore suggested, however, have been open to various objections, among which may be noted the complexity of construction rendering the device too expensive for ordinary use, lack of ruggedness so that the device may become inoperative under the rigors of the service to which it is put, lack of durability so that one or more parts are likely to become broken under service conditions, unsightliness as an attachment to the wheel, oversensitiveness so that the device may give false signals under the side sway of the vehicle, insensitiveness so that the device may fail to work in the presence of mud, snow and the like, etc.

It is an object of this invention to provide a tire alarm which is relatively simple in construction so that it can be manufactured in quantities by simple operations, assembled with the minimum of labor and produced at a reasonable cost.

Another object of this invention is to provide a tire alarm which can be easily applied by the ordinary driver without the use of special tools or the assistance of skilled mechanics.

Another object of this invention is to provide a tire alarm which is rugged so that it will continue operative notwithstanding that the vehicle may pass frequently over rough or muddy roads or otherwise be subjected to the rigorous conditions frequently encountered by such vehicles.

Another object of this invention is to provide a tire alarm which is composed of elements that are strong and durable so that the device is unlikely to break in service and therefore be inoperative at the very time when its warning is needed.

Another object of this invention is to provide a tire alarm which is inconspicuous and may be readily attached to the inner side of the wheel where it will not be unsightly.

Another object of this invention is to provide a tire alarm which is so constructed that it will not give false alarms under the side sway of the vehicle or when the vehicle is turning a corner, etc.

Another object of this invention is to provide a tire alarm which is so constructed that it will function although it may become coated with mud or snow, etc.

Other objects will appear as the description of the invention proceeds.

The invention is capable of receiving a variety of mechanical expressions, two of which are shown on the accompanying drawing, but it is to be expressly understood that the drawing is for purposes of illustration only, and not to be construed as a definition of the limits of the invention, reference being had to the appended claims for that purpose.

Referring in detail to the drawing, wherein like reference characters are applied to the same parts in the different figures:—

Fig. 1 is a diagrammatic view of an automobile equipped with the present invention;

Fig. 2 is an enlarged section of the felly and tire showing an embodiment of the present invention in operative position;

Fig. 3 is a perspective view of the alarm with the parts separated for clearness of understanding;

Fig. 4 is a fragmentary view of a wire wheel with an embodiment of the present invention mounted thereon; and Fig. 5 is an enlarged perspective of the embodiment shown in Fig. 4.

In the form shown in Figs. 1, 2 and 3, the alarm is shown as mountable upon the felly of the wheel by means of one of the bolts, commonly employed to retain a demountable ring in position, but it is to be expressly understood that the present invention is not restricted to this manner of mounting the alarm, as any suitable mounting means may be employed. As shown, the alarm comprises a base member 10 provided with a projection 11 which is apertured at 12 so that the base member may be secured against the felly 13 by the head 14 of the bolt 15 commonly used for retaining the demountable ring 16 in position. The projection 11 has an angularly extending portion 17 provided at its extremity with a sleeve 18 to constitute a pivot bearing. While this base member may be built up of separate parts, it is preferred for cheapness and simplicity of construction to stamp the entire member out of sheet metal and bend the portion 17 into the proper angular relationship for the support of the lever hereinafter described, the extremity of the portion 17 being bent into the sleeve 18 to provide a pivot bearing. The base member 10 may also be provided with apertures 19 for the more ready inflow and outflow of air to the chamber back of the diaphragm to be described.

Pivotally mounted in the sleeve 18 is a lever 20 of such length that its free end 21 extends radially to approximately the mid-thickness of the tire when properly inflated. The opposite end of the lever 22 is apertured at 23 for attaching means to the diaphragm, and intermediate its length said lever carries a pivot pin 24 mounted in any suitable way thereon. The ratio of the lever arms may be selected in accordance with the convenience of installation or in accordance with the volume of sound desired. For simplicity of construction, the lever is preferably stamped out of sheet metal and bent into the desired shape, and to provide the mounting for the pivot pin 24 the blank of the lever has laterally extending portions 25 which may be bent right angularly and apertured to provide the pivot mounting. The lever is preferably made of spring material for a purpose hereinafter explained, and is therefore desirably made of spring steel. If desired, however, the lever may be made in two parts, with the tire engaging end of spring steel and the opposite end of sheet iron.

Lever 20 is mounted my means of the pivot pin 24 in the sleeve 18 and a spring 26 is preferably provided to normally urge the free end of the lever toward the tire. As shown, a coil spring is wrapped around the pivot pin 24 within the housing afforded by the pivot carrying lugs 25, and has its free end bearing against that end of the lever which is attached to the diaphragm. The sleeve 18 is interrupted intermediate its length, as shown at 27, to provide a space for the wrapping of the coil spring around the pivot pin.

Also mounted on the base member 10 is a diaphragm 30. If desired the housing for the the diaphragm may be formed on or attached to the base member 10, separately from the diaphragm 30, but as shown, the housing 31 for the diaphragm is formed integral with the diaphragm and takes the form of a cylindrical flange integral with the periphery of the diaphragm. Any suitable means may be provided for attaching the housing 31 to base member 10. In the form shown the base member 10 is provided with a plurality of tabs 32 and the housing flange 31 is concaved so that the tabs 32 may be bent into interlocking engagement therewith. If desired, however, the housing may be provided with an apertured flange or aperture tabs to interengage with the tabs on the base member, or tabs to engage in apertures in the base member. The diaphragm and its housing are preferably drawn as a cup from material of sufficient thinness and resilience so that the bottom of the cup shall constitute a diaphragm having the requisite range of movement and volume of sound.

The diaphragm 30 is attached to the end 22 of the lever 20 in any suitable way, as by a pin or bolt 35 passing through a central aperture in the diaphragm 30 and the aperture 23 in lever 20, to which latter it is secured by a nut 36. To prevent the bolt and nut from working loose the head 38 of the bolt and the aperture in the diaphragm, or a depression around the same may be suitably shaped to prevent relative rotation. Similarly, the end 22 of lever 20 may have a depression around the hole 23 shaped to fit the nut 36 so that the engagement of the nut 36 in the depression of the lever, under the action of the coil spring 26, will prevent rotation of said nut.

Mounted on the bolt 35 between the lever 20 and the diaphragm 30 is a sleeve member 40, the length of which may be less than the normal distance between the end of the lever and the diaphragm so that when the aperture 23 in the lever 20 is made larger than the bolt, to permit relative movement between the lever and bolt—as is preferred, the lever will force the sleeve ahead of it and engage and actuate the diaphragm only after an interval of movement determined by the difference in length between the sleeve 40 and the normal distance between the end of the lever and the diaphragm. This arrangement enables the diaphragm to be actuated more by impact than by mere lever operation, and a somewhat sharper and more distinctive warning is obtained. However, if desired, the sleeve may completely fill the space between the lever and diaphragm, or the sleeve may be omitted and the lever fixedly attached to the bolt When the lever moves relatively to the bolt any suitable means may be employed to prevent relative rotation between the bolt and nut and diaphragm.

In the form shown in Figs. 4 and 5, a suitable mounting for use on a wire wheel has been exemplified. As here shown, the base member 50 is provided at opposite sides with lateral extensions 51 which are reversely folded in such shape that they are designed to embrace a pair of adjacent spokes 52 of the wheel. Any suitable means may be employed for retaining the base member in position, the bolts 53 and nuts 54 being shown for clamping the extensions 51 on the spokes. In the form shown, the diaphragm housing 31 is provided with tabs 55 which may pass through apertures in the base member 50 and be bent into interlocking engagement therewith. Otherwise, the structure of Figs. 4 and 5 is, or may be, identical with that heretofore described in conjunction with Figs. 1 to 3.

In operation, the parts are normally in the position shown in Fig. 2 and the free end 21 of the lever 20 is contiguous to but out of engagement with the middle portion of the tire. As long as the tire remains normally inflated the lever 20 will not be actuated. If the tire becomes abnormally deflated or flat, however, the tire is bulged laterally by the weight of the car and every time the alarm approaches the ground, this lateral bulging of the tire forces the free end of the lever 20 outwardly, causing the inner end of the lever to move toward the right, as viewed in Fig. 2, and actuate the diaphragm 30. As the alarm recedes from the ground, the weight having been taken off of the tire adjacent thereto, the lateral bulging of the tire decreases and the lever 20 moves to the left as viewed in Fig. 2, under action of the spring 26, and the diaphragm 30 is operated in the opposite direction. Therefore, in every rotation of the wheel the diaphragm is caused to give two sharp clicks or signals which are of sufficient volume to warn the driver of the condition of his tire.

Owing to the resilient character of the lever 20, the lever may give under small pressures without operating the diaphragm, the spring 26 resisting inward movement of the inner end of the lever under pressures of such magnitude, and when the sleeve 40 is used so that there is normally a space between the end of the sleeve and the diaphragm, the lever may even have a slight bodily movement without actuating the diaphragm. Therefore, in rounding corners or similar conditions, the lateral bulging of the tire does not cause the alarm to be actuated.

It will, therefore, be perceived that a tire alarm has been provided which is simple in construction and inexpensive to manufacture and assemble. All of the parts except the pivot pin and the diaphragm connection may be formed up of sheet metal stamped and bent to shape. The device is, therefore, inexpensive to manufacture and may be produced in quantities at a low cost because of the simplicity of the manufacturing and assembling operations. The tire alarm may also be easily mounted on the wheel by the ordinary driver without use of special tools or special skill.

The structure is both rugged and durable because its parts are of a character not likely to be broken or rendered inoperative even under the most rigorous conditions of travel. Moreover, the construction is such that the device is unlikely to become inoperative although coated with mud or snow, and at the same time it is not so sensitive as to give false warnings under side sway or in rounding a corner. Also, the structure is such that there is no appreciable protuberance from the side of the wheel, and by mounting the same on the inner side of the wheel the presence of the alarm is barely noticeable. There is thus provided a tire alarm which may be sold at a reasonable price and which, because of its ruggedness and durability, is reasonably certain to be in operative condition whenever the need of its service arises.

The device may also be readily adjusted to give the desired note of warning by tightening or loosening the nut 36 so as to vary the extent of movement of the lever end in actuating the diaphragm, and this is true whether the diaphragm is fixedly attached to the lever end or the diaphragm is actuated by an interposed sleeve forced into engagement therewith by the lever arm.

While the embodiments of the invention illustrated on the drawing have been described with considerable particularity, it is expressly understood that the invention is not restricted thereto, as the invention is capable of receiving a variety of mechanical expressions, some of which will now readily suggest themselves to those skilled in the art, while changes may be made in the materials and details of construction and in the arrangement and proportion of parts, without departing from the spirit of this invention. Reference is, therefore, to be had to the appended claims for a definition of the invention.

What is claimed is:

1. In a tire alarm, a base member adapted to be mounted on a wheel, a diaphragm mounted on said base member, and a lever pivotally mounted on said base member, said lever having one end extending adjacent to and operatively related to said diaphragm and its opposite end disposed for actuation by the tire.

2. In a tire alarm, a base member adapted to be mounted on a wheel, a diaphragm mounted on said base member, and a lever of resilient material pivotally mounted on said base member, said lever having one end operatively related to said diaphragm and its opposite end disposed for actuation by the tire.

3. In a tire alarm, a base member adapted to be mounted on a wheel and having a lateral projection constituting a pivot support, a diaphragm mounted on said base member, and a lever of resilient material pivotally mounted on said support, said lever having one end operatively related to said diaphragm and its opposite end positioned to be actuated by said tire.

4. In a tire alarm, a base member adapted to be mounted on a wheel, a cup-shaped member mounted on said base member and forming a diaphragm, and a lever mounted on said base member, said lever having one end extending adjacent to and operatively related to said diaphragm and its opposite end disposed to be actuated by said tire.

5. In a tire alarm, a base member adapted to be mounted on a wheel, a cup-shaped member mounted on said base member and forming a diaphragm, and a lever of resilient material mounted on said base member, said lever having one end operatively related to said diaphragm and its opposite end disposed to be actuated by said tire.

6. In a tire alarm, a base member formed of sheet material and having an angularly extending section forming a pivot support, a diaphragm mounted on said base member, and a lever of sheet material pivotally mounted on said extension, said lever having one end extending adjacent to and operatively related to said diaphragm and its opposite end disposed to be actuated by said tire.

7. In a tire alarm, a base member adapted to be mounted on a wheel and having a pivot support, a diaphragm mounted on said base member, and a lever formed of sheet spring metal and mounted on said pivot support, said lever having one end operatively related to said diaphragm with its opposite end disposed to be actuated by said tire.

8. In a tire alarm, a base member adapted to be mounted on a wheel and provided with a pivot support, a sheet metal cup mounted on said base member with the bottom of said cup constituting a diaphragm, said base member and cup being provided with interlocking means for fixedly retaining said cup in position, and a lever mounted on said pivot support, said lever having one end operatively related to said diaphragm and its opposite end disposed to be actuated by the tire.

9. In a tire alarm, a base member adapted to be mounted on a wheel, a diaphragm mounted on said base member, a lever of resilient material mounted on said base member, said lever having one end operatively related to said diaphragm and its opposite end disposed to be actuated by the tire, and means for resisting actuation of said diaphragm by reason of pressures on said lever below a predetermined magnitude.

10. In a tire alarm, a base member adapted to be mounted on a wheel, a diaphragm mounted on said base member, a lever of resilient material mounted on said base member, said lever having one end operatively related to said diaphragm and its opposite end disposed to be actuated by the tire, and a spring engaging the inner end of said lever to resist a diaphragm actuating movement thereof unless the pressure on said lever exceeds a predetermined magnitude.

11. In a tire alarm, a base member adapted to be mounted on a wheel, a diaphragm mounted on said base member, a lever mounted on said base member with one end in position to be actuated by said tire, and means operatively connecting the opposite end of said lever with said diaphragm and adjustable to predetermine the movement thereof.

12. In a tire alarm, a base member adapted to be mounted on a wheel, a diaphragm mounted on said base member, a lever pivotally mounted on said base member with one end in position to be actuated by the tire, the opposite end of said lever being spaced from said diaphragm, and means including a lost motion connection and operatively connecting said diaphragm with said end of the lever.

13. In a tire alarm, a base member adapted to be mounted on a wheel, a diaphragm mounted on said base member, a lever mounted on said base member with one end in position to be actuated by said tire, the opposite end of said lever being spaced from said diaphragm, a pin projecting from said diaphragm and passing through an aperture in said lever, and a sleeve mounted on said pin and interposed between said diaphragm and lever, said sleeve being shorter than the normal distance between said diaphragm and lever.

14. In a tire alarm, a base member adapted to be mounted on a wheel, a diaphragm mounted on said base member, a lever pivotally mounted on said base member with one end in position to be actuated by the tire, and a bolt and nut connection between said diaphragm and the opposite end of said lever, said bolt and nut having interlocking engagement with said diaphragm and lever to prevent relative rotation thereof.

In testimony whereof I have signed this specification.

LOUIS C. GALLI.